United States Patent
Nakagishi et al.

(10) Patent No.: US 6,956,615 B2
(45) Date of Patent: Oct. 18, 2005

(54) STRUCTURE FOR MOUNTING A SOLID-STATE IMAGING DEVICE

(75) Inventors: Toshio Nakagishi, Saitama-ken (JP); Koji Sato, Saitama-ken (JP); Isao Okuda, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 774 days.

(21) Appl. No.: 09/769,455

(22) Filed: Jan. 26, 2001

(65) Prior Publication Data

US 2001/0010562 A1 Aug. 2, 2001

(30) Foreign Application Priority Data

Jan. 28, 2000 (JP) ........................................ 2000-019419

(51) Int. Cl.⁷ .............................................. H04N 5/225
(52) U.S. Cl. ...................................... 348/374; 257/433
(58) Field of Search ................................. 257/433, 678, 257/686, 688, 699, 711, 730, 731; 250/239; 348/335, 340, 374, 375, 45, 65

(56) References Cited

U.S. PATENT DOCUMENTS

| | | | | |
|---|---|---|---|---|
| 4,594,613 A | * | 6/1986 | Shinbori et al. | ............ 348/340 |
| 5,040,069 A | * | 8/1991 | Matsumoto et al. | .......... 348/76 |
| 5,072,283 A | * | 12/1991 | Bolger | ........................ 257/676 |
| 5,087,964 A | * | 2/1992 | Hatta | .......................... 257/680 |
| 5,596,229 A | * | 1/1997 | Simon | ........................ 257/727 |
| 5,861,654 A | * | 1/1999 | Johnson | ..................... 257/433 |
| 5,870,638 A | | 2/1999 | Kurosawa | |
| 5,952,714 A | * | 9/1999 | Sano et al. | .................. 257/680 |
| 6,035,147 A | | 3/2000 | Kurosawa | |
| 6,204,896 B1 | * | 3/2001 | Matsuhira et al. | ............ 349/12 |
| 6,362,921 B1 | * | 3/2002 | Iida et al. | .................... 359/627 |
| 6,392,703 B1 | * | 5/2002 | Uchino et al. | ............... 348/373 |
| 6,528,778 B1 | * | 3/2003 | Kimba et al. | ............. 250/214.1 |
| 6,628,339 B1 | * | 9/2003 | Ferland et al. | .............. 348/374 |
| 6,693,674 B1 | * | 2/2004 | Wataya et al. | .............. 348/373 |

FOREIGN PATENT DOCUMENTS

| | | | | |
|---|---|---|---|---|
| JP | 59046051 A | * | 3/1984 | ........... H01L/23/28 |
| JP | 04291886 A | * | 10/1992 | ........... H04N/5/335 |

* cited by examiner

*Primary Examiner*—James J. Groody
*Assistant Examiner*—Yogesh Aggarwal
(74) *Attorney, Agent, or Firm*—Greenblum & Bernstein, P.L.C.

(57) ABSTRACT

A structure for mounting a solid-state imaging device on an optical unit, which includes a metal plate having a flat surface, a backside surface opposite to the flat surface, a projected surface projected by a predetermined height from the flat surface, the projected surface being parallel to the flat surface, and at least one opening formed on the projected surface and accessible through the backside surface; the solid-state imaging device having a front surface for receiving light and a back surface, the imaging device being secured to the metal plate by means of adhesive applied at least to a corner edge portion formed by the inner circumferential surface of the at-least-one opening of the metal plate and the back surface of the imaging device when the imaging device contacts the projected surface of the metal plate; and fixing members for fixing the metal plate carrying the imaging device thereon onto the optical unit.

18 Claims, 6 Drawing Sheets

STRUCTURE FOR MOUNTING A SOLID-STATE IMAGING DEVICE

BACKGROUND OF THE INVENTION

The present invention relates to a structure for mounting a solid-state imaging device such as a CCD (Charge Coupled Device) on a digital image capturing apparatus such as a digital camera.

Recently, a digital camera is used instead of a conventional camera which employs a silver-salt film for recording a captured optical image. In the digital camera, an optical image is captured by the imaging device and converted to digital image data so as to be recorded in an digital storage device such as a built-in memory or a detachable card-type memory.

When the imaging device is built in a camera, the imaging device is first soldered on a glass-epoxy circuit board, and the circuit board carrying the imaging device is then mounted on an optical unit. Please note that, in this specification, the "optical unit" is defined as an unit carrying a lens assembly, an infrared cutting filter and so on, and a photographing optical system of a digital camera is constituted by mounting a circuit board carrying the imaging device on the optical unit.

In the meantime, a solid-state imaging device having more than 2 million pixels has recently been put in practical use. In such a solid-state imaging device, the size of one pixel is so small that it becomes necessary for the imaging device to be mounted on the optical unit with very high positioning accuracy. That is, in order to obtain precise image data, the light receiving surface of the imaging device must align with the focusing surface of the photographing optical system with high accuracy. If the light receiving surface of the imaging device is tilted with respect to and/or displaced from the focusing surface of the photographing optical system, it becomes difficult to obtain precise data at the respective pixels.

With the above-explained conventional mounting structure, however, the positioning accuracy required for the imaging device of high pixel resolution can hardly be obtained, due to the uneven thickness of the solder layer with which the imaging device is adhered to the circuit board and/or to the inherent warp of the glass-epoxy circuit board itself.

There have been various other structures for mounting a solid-state imaging device on an optical unit, with which, however, the imaging device can hardly be mounted on the optical unit with the required positioning accuracy and/or with efficient workability.

SUMMARY OF THE INVENTION

It is therefore an object of the present invention to provide an improved structure for mounting a solid-state imaging device capable of mounting an imaging device with high positioning accuracy required in case of the imaging device of high pixel resolution as well as with efficient workability.

For the above purpose, in accordance with the present invention, there is provided a structure for mounting a solid-state imaging device, including:

a metal plate having a flat surface, a backside surface opposite to the flat surface, a projected surface projected by a predetermined height from the flat surface, the projected surface being parallel to the flat surface, and at least one opening formed on the projected surface and accessible through the backside surface;

the solid-state imaging device having a front surface for receiving light and a back surface, the imaging device being secured to the metal plate by means of adhesive applied at least to a corner edge portion formed by the inner circumferential surface of the at-least-one opening of the metal plate and the back surface of the imaging device when said imaging device contacts the protected surface of the metal plate; and fixing members for fixing the metal plate carrying the imaging device thereon onto the optical unit.

With the above constituted structure, as the metal plate carrying the imaging device with high positioning accuracy is to be mounted onto the optical unit, tilting and/or floating of the imaging device caused due to soldering in the conventional structure can be avoided, and mounting of the imaging device on the optical unit with high positioning accuracy can be performed easily with efficient workability.

The structure may further comprise a circuit board electrically connected to the imaging device, the circuit board being provided with an opening through which the projected surface of the metal plate passes so that the circuit board is disposed between the imaging device and the metal plate when the former is secured to the latter.

That is, an imaging device block is assembled in advance by the imaging device, the circuit board and the metal plate, and the device block is to be mounted as one unit on the optical unit, so that productivity can be increased.

In one embodiment, the flat surface is provided with an opening corresponding to the at-least-one opening of the projected surface, and the projected surface comprises the top surface of a wall portion formed to surround the opening of the flat surface.

Preferably, the projected surface includes the top surface of a portion protruded from the flat surface of the metal plate, and the opening of the circuit board is set to be larger than that of the protruded portion of the metal plate but smaller than that of the imaging device. The protruded portion may comprise a quadrilateral wall portion, and the opening of the circuit board may be of a square shape.

BRIEF DESCRIPTION OF THE ACCOMPANYING DRAWINGS

DESCRIPTION OF THE EMBODIMENTS

Figure 1:
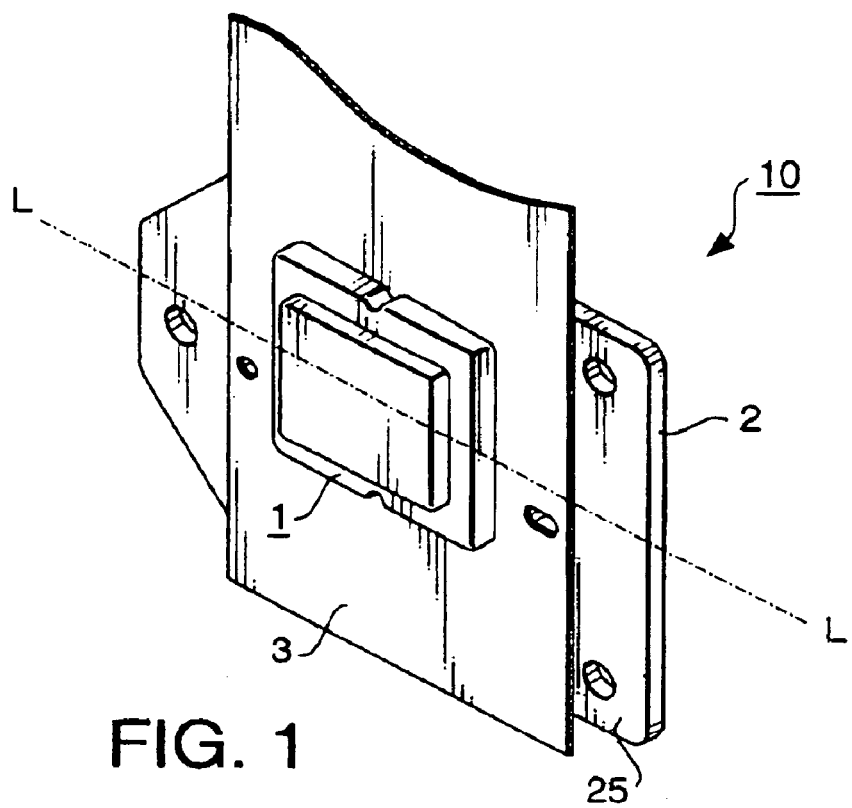
FIG. 1 is a front perspective view of a solid-state imaging device block embodying the present invention.
Figure 2:
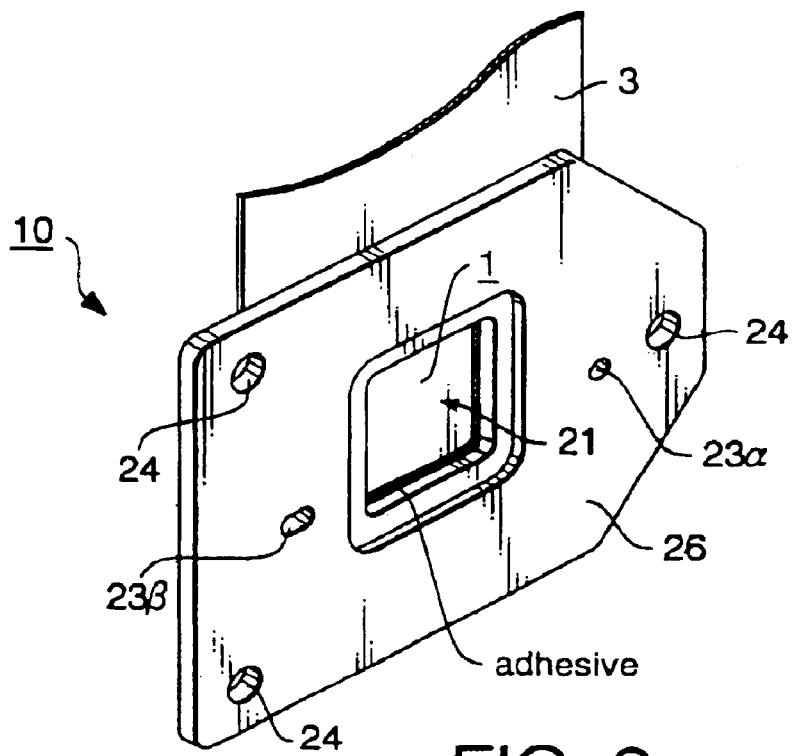
FIG. 2 is a rear perspective view of the device block shown in FIG. 1.
Figure 3:
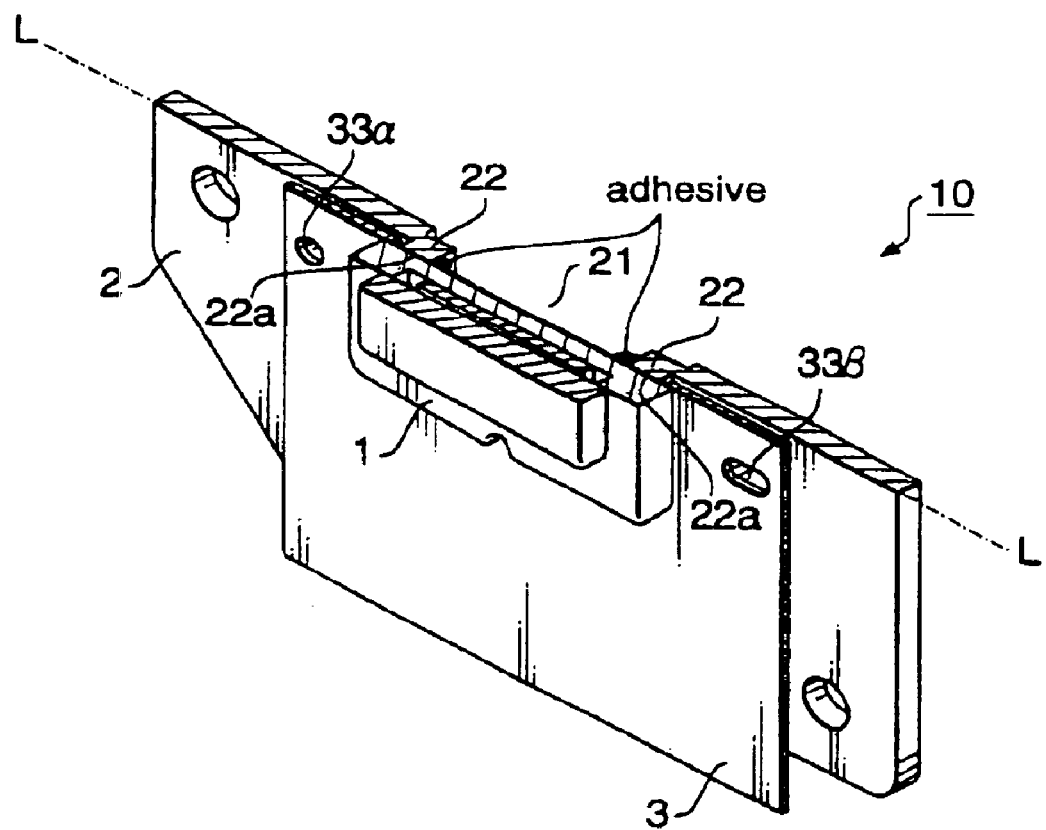
FIG. 3 is a perspective view of the device block cross-sectioned along the line L—L In FIG. 1.

FIGS. 1 through 3 show a solid-state imaging device block 10 embodying the present invention to be mounted on an optical unit 100 (see FIG. 5) of a digital camera.

The device block 10 comprises a CCD 1 having more than 2 million pixels, a metal plate 2 for anchoring the CCD 1 to the optical unit 100, and a flexible printed circuit board 3 arranged between the CCD 1 and the metal plate 2.

Figure 4:
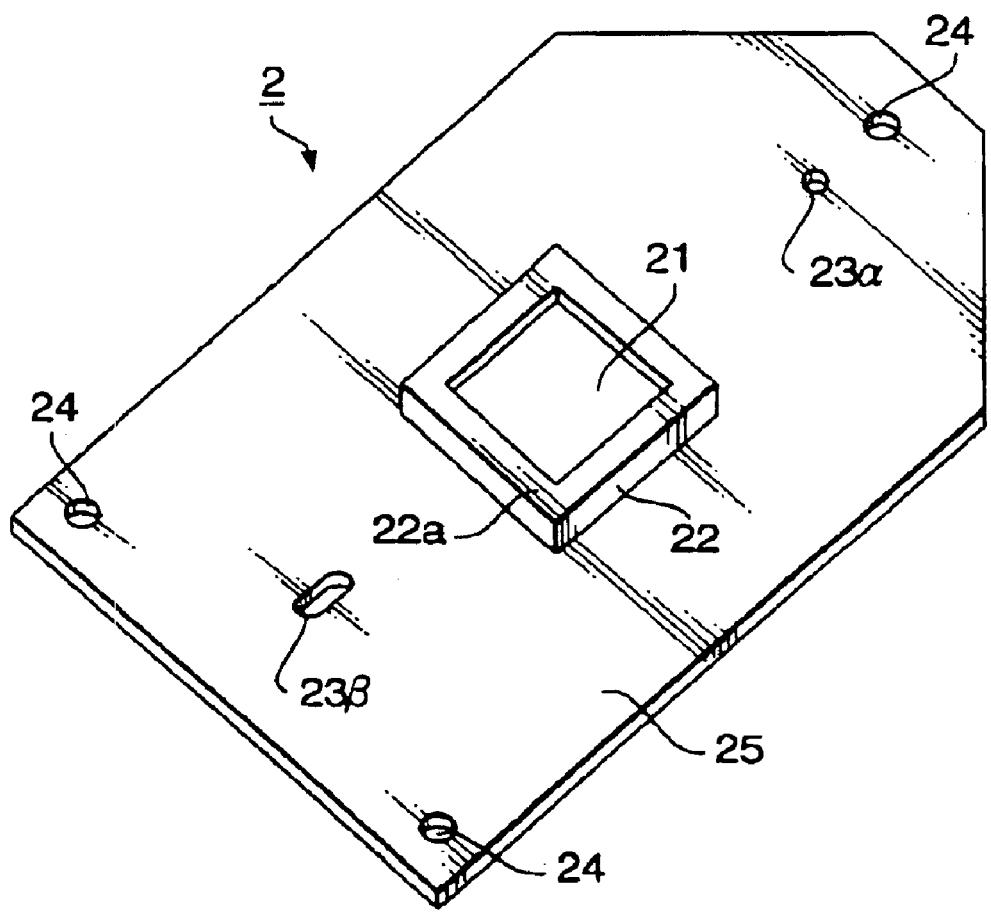
FIG. 4 is an enlarged perspective view of a metal plate of the device block of FIG. 1.

The metal plate 2 is provided with, as shown in FIGS. 3 and 4, a positioning hole 23α, an oval hole 23β and three screw holes 24 as well as a square opening 21. The square opening 21 is surrounded by a quadrilateral wall portion 22 protruded from the flat surface 25 of the metal plate 2 to face the optical unit 100. The height of the wall portion 22 is set to be larger than the thickness of the printed circuit board 3, and the top surface 22a of the wall portion 22 is set to be parallel to the flat surface 25 of the metal plate 2.

Figure 5:
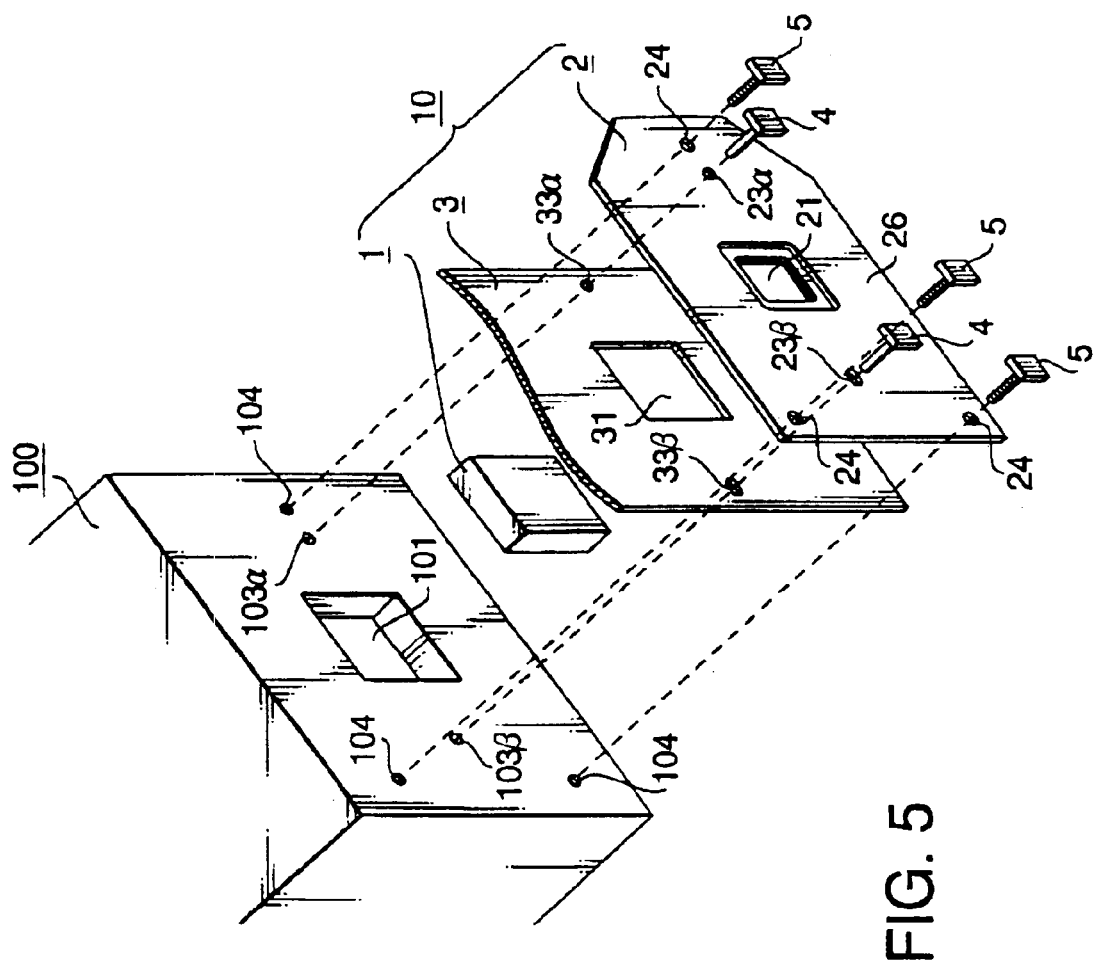
FIG. 5 is an exploded perspective view of the device block mounted on an optical unit.

The flexible printed circuit board 3 is to electrically connect the CCD 1 with an image processing circuit, not shown, or the like to transmit the electric signal generated at the CCD 1 thereto. The circuit board 3 is provided with, as shown in FIGS. 4 and 5, a square opening 31, a positioning hole 33 α and an oval hole 33β corresponding to the square opening 21, the positioning hole 23α and the oval hole 23β of the metal plate 2, respectively. The opening 31 is set to have the size larger than the wall portion 22 of the metal plate 2 but smaller than the CCD 1.

The CCD 1 is anchored to the flat surface 22a of the wall portion 22 of the metal plate 2 so as to fully cover the square opening 21 of the metal plate 2 while holding the flexible circuit board 3 therebetween. The CCD 1 adhered to the metal plate 2 is then electrically connected with the circuit board 3 by soldering.

In the above embodiment, the metal plate 2 is employed to support the CCD 1 since the metal plate 2 is of high stiffness, high dimensional stability against the changes of temperature and humidity, and machinability with high accuracy. Further, the metal plate 2 has a high heat conductivity so that the heat generated by the CCD 1 can be well absorbed and radiated, and the deterioration in image quality due to dark current in the CCD 1 can be suppressed. In this embodiment, a plate made of aluminum is employed as the metal plate 2, and the top surface 22a of the wall portion 22 is so machined as to be parallel to the flat surface 25 of the metal plate 2 with high accuracy.

The optical unit 100 on which the imaging device 10 is to be mounted is provided with, as shown in FIG. 5, a square opening 101, a pair of positioning holes 103α and 103β, and three threaded holes 104 corresponding to the square opening 21, the positioning hole 23α, the oval hole 23β and the three-screw holes 24 of the metal plate 2, respectively.

Next, how to assemble the imaging device block 10 carrying the CCD 1 as well as how to mount the assembled block 10 on the optical unit 100 will be explained by referring to FIG. 5.

First of all, the metal plate 2 is held by a jig, not shown, and the flexible printed circuit board 3 is overlapped to the metal plate 2 with the wall portion 22 of the metal plate 2 passing through the square opening 31 of the circuit board 3. The CCD 1 is held by other jig, not shown, and moved toward the top surface 22a of the wall portion 22 of the metal plate 2 by means of the other jig until a backside flat surface of the CCD 1 intimately and opposingly abuts the top surface 22a with holding the circuit board 3 between the flat surface 25 of the metal plate 2 and the CCD 1. The position of the CCD 1 relative to the top surface 22a of the wall portion 22 in the direction perpendicular to the optical axis is adjusted, while observing the imaging surface by an optical device, not shown, so that the imaging surface comes to a predetermined position. Under the state shown in FIG. 2, the backside flat surface of the CCD 1 can be seen through the opening 21 when viewed from a backside surface 26 of the metal plate 2.

After positioning of the CCD 1 in the direction perpendicular to the optical axis is completed, an ultraviolet-curing adhesive is applied, as illustrated in FIGS. 2 and 3, to the corner edges of L-shaped section formed by the inner circumferential surface of the square opening 21 of the metal plate 2 and the backside flat surface of the CCD 1 contacting the wall portion 22 of the metal plate 2. The applied adhesive is then exposed to ultraviolet light to be hardened, thereby anchoring the CCD 1 to the metal plate 2.

When applying the adhesive, it should be prevented that the adhesive penetrates between the top surface 22a of the wall portion 22 of the metal plate 2 and the contacting surface of the CCD 1, because the CCD 1 may be tilted with respect to the metal plate 2 by the penetrated adhesive. In this connection, it is preferable to employ the ultraviolet-curing adhesive having the viscosity of 1–30 Pa·s, and more preferably 17–27 Pa·s.

Once the CCD 1 is anchored to the wall portion 22 of the metal plate 2, the flexible printed circuit board 3 is surely held between the metal plate 2 and the CCD 1 and may not be removed therefrom, as the wall portion 22 of the metal plate 2 secured to the contacting surface of the CCD 1 passes through the square opening 31 of the circuit board 3.

Then, the precise positioning of the circuit board 3 with respect to the metal plate 2 is performed by passing a pair of pins 4 through the positioning holes 23α & 33α and the oval holes 23β & 33β, respectively. Since the posture of the circuit board 3 is primarily regulated by the wall portion 22 of the metal plate 2, the precise positioning can be performed very easily. Thereafter, lead wires, not shown of the CCD 1 are soldered to the corresponding parts of the circuit board 3 so as to electrically connect the CCD 1 to the circuit board 3.

With this, assembling of the imaging device block 10 is completed.

The thus assembled imaging device block 10 carrying the CCD 1 is moved toward the optical unit 100 by means of the jig supporting the metal plate 2 of the block 10 until the CCD 1 of the block 10 contacts the optical unit 100. While the block 10 is approaching the optical unit 100, the pair of pins 4 whose front ends are outwardly protruded from the block 10 with passing through the metal plate 2 and the circuit board 3 are to be inserted into the positioning holes 103α and 103β of the optical unit 100, respectively, whereby positioning of the block 10 with respect to the optical unit 100 can be automatically performed so that the CCD 1 of the block 10 is surely fit into the square opening 101 of the optical unit 100.

Thereafter, three screws 5 are threaded into the threaded holes 104 of the optical unit 100 through the corresponding screw holes 24 of the metal plate 2 of the block 10, respectively, to securely mount the block 10 onto the optical unit 100.

With the above explained structure for mounting a solid-state imaging device (i.e., the CCD 1) embodying the invention, as the CCD 1 is secured to the metal plate 2 with high positioning accuracy to constitute the imaging device block 10, and the imaging device block 10 is to be mounted as a unit on the optical unit 100, tilting and/or floating of CCD with respect to and/or from the glass-epoxy board, which have been occurred In the conventional structure, due to soldering, can be prevented. Further and therefore, mounting of CCD on the optical unit with high positional accuracy can be performed easily with efficient workability.

In the meantime, in the above-mentioned embodiment, the size of the square opening 31 of the flexible printed circuit board 3 is set to be larger than that of the wall portions 22 of the metal plate 2, but it may be set to be substantially equal to each other so that the posture of the circuit board 3 is more strictly regulated with respect to the metal plate 2.

On the contrary, the opening 31 may be formed fairly larger than that of the wall portions 22 of the metal plate 2. In this case, the shape of the opening 31 may be freely determined so far as the lead wires of the CCD 1 can be connected thereto.

Figure 6:
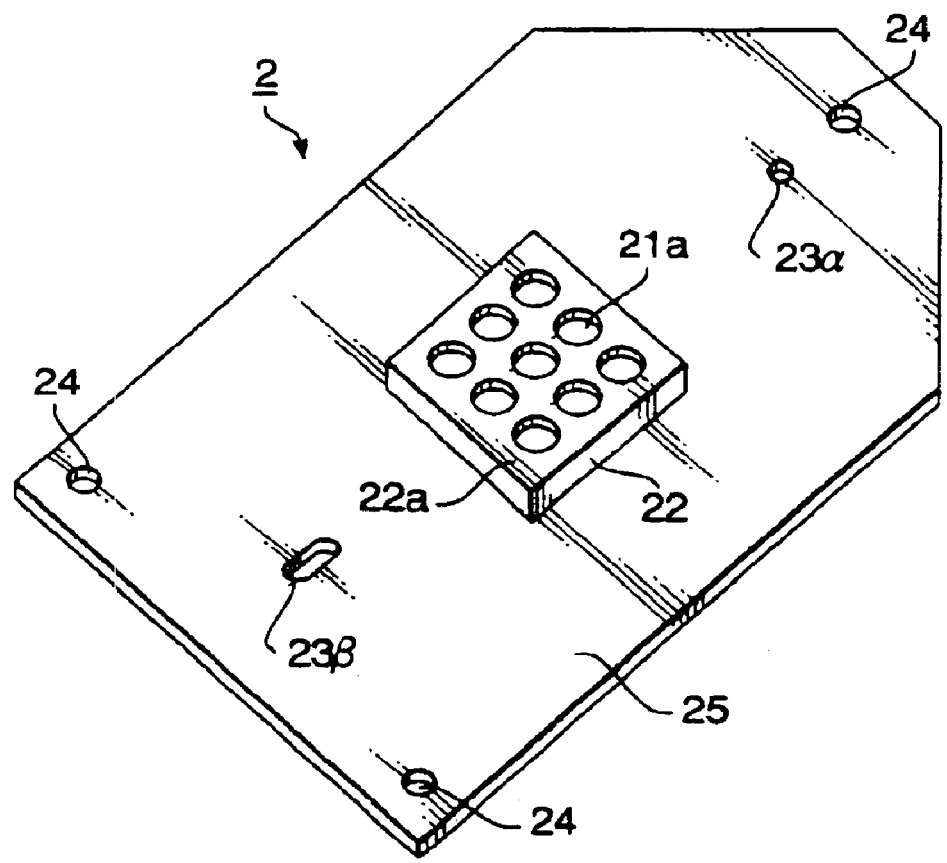
FIG. 6 is a perspective view of a modified metal plate.
Figure 7:
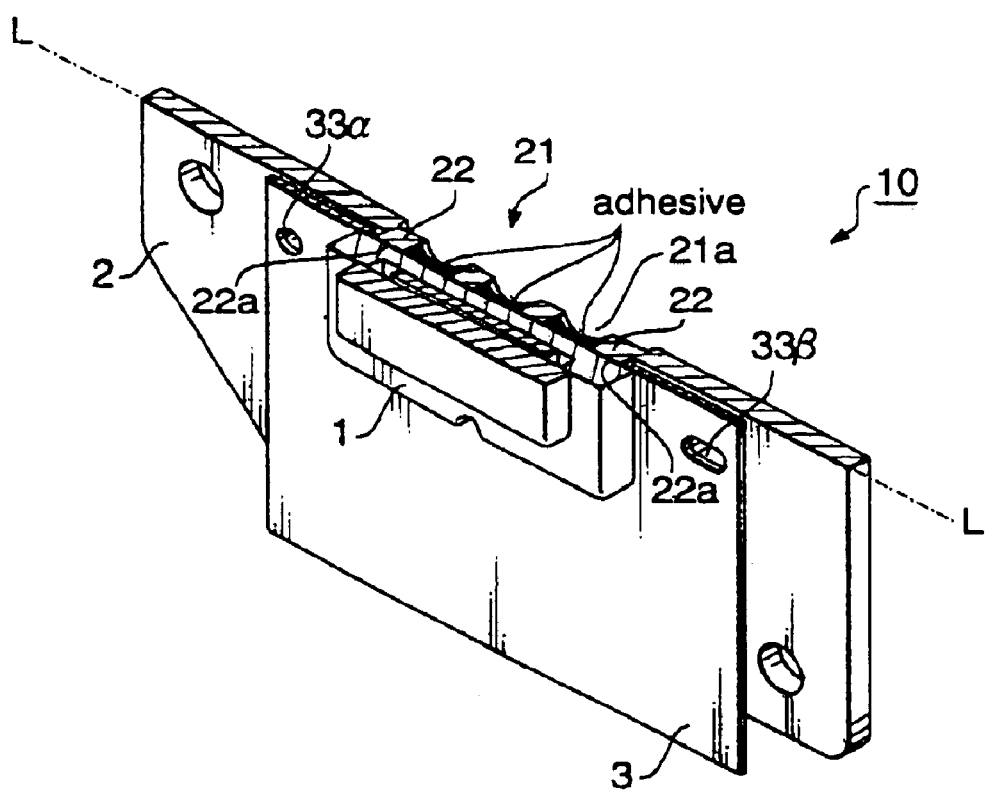
FIG. 7 is a cross-sectioned perspective view of the device block employing the modified metal plate.

Moreover, as shown in FIGS. 6 and 7, the top surface 22a of the wall portions 22 on the metal plate 2 may be extended to fully cover the square opening 21, and a plurality of holes (openings) 21a are to be formed on the extended top surface, for pouring the ultraviolet curing adhesive thereinto to anchor the CCD 1 thereto.

The present disclosure relates to the subject matter contained in Japanese Patent Application No. 2000-019419, filed on Jan. 28, 2000, which is expressly incorporated herein by reference in its entirety.

What is claimed is:

1. A solid-state imaging device block comprising:

a metal plate having a flat surface, a backside surface opposite to said flat surface, a projected surface projected by a predetermined height from said flat surface, said projected surface being parallel to said flat surface, and at least one opening formed on said projected surface and accessible through said backside surface; and a solid-state imaging device having a front surface for receiving light and a back surface, said back surface contacting said projected surface of said metal plate, said imaging device being secured to said metal plate by adhesive applied at least to a corner edge portion formed by the inner circumferential surface of said at-least-one opening of the metal plate and said back surface of the imaging device.

2. The device block according to claim 1, which further comprises a circuit board electrically connected to said imaging device, said circuit board being provided with an opening through which said projected surface of the metal plate passes so that said circuit board is disposed between said imaging device and said metal plate.

3. The device block according to claim 2, wherein said predetermined height is larger than the thickness of said circuit board.

4. The device block according to claim 2, wherein said circuit board comprises a flexible printed circuit board.

5. The device block according to claim 1, wherein said projected surface comprises a top surface of a portion protruded from said flat surface of the metal plate.

6. The device block according to claim 5, wherein said flat surface is provided with an opening corresponding to said at-least-one opening of said projected surface, and said protruded portion comprises a wall portion formed to surround said opening of the flat surface.

7. The device block according to claim 6, wherein said opening of the flat surface is of a quadrangular shape, and said wall portion comprises a quadrilateral wall.

8. The device block according to claim 2, wherein said projected surface comprises the top surface of a portion protruded from said flat surface of the metal plate, and said opening of the circuit board is set to be larger than that of said protruded portion of the metal plate but smaller than that of said imaging device.

9. The device block according to claim 8, wherein said protruded portion comprises a quadrilateral wall portion, and said opening of the circuit board is of a square shape.

10. The device block according to claim 1, wherein the viscosity of said adhesive is 1–30 Pa·s.

11. The device block according to claim 10, wherein said adhesive comprises a ultraviolet curing adhesive.

12. A structure for mounting a solid-state imaging device on an optical unit, which comprises:

a metal plate having a flat surface, a backside surface opposite to said flat surface, a projected surface projected by a predetermined height from the flat surface, said projected surface being parallel to said flat surface, and at least one opening formed on said projected surface and accessible through said backside surface;

said solid-state imaging device having a front surface for receiving light and a back surface, said back surface contacting said projected surface of said metal plate, said imaging device being secured to said metal plate by adhesive applied at least to a corner edge portion formed by the inner circumferential surface of said at-least-one opening of the metal plate and said back surface of the imaging device; and fixing members for fixing said metal plate carrying said imaging device thereon onto said optical unit.

13. The structure according to claim 12, which further comprises a circuit board electrically connected to said imaging device, said circuit board being provided with an opening through which said projected surface of the metal plate passes so that said circuit board is disposed between the imaging device and the metal plate, and wherein said predetermined height is larger than the thickness of said circuit board.

14. The structure according to claim 12, wherein said flat surface is provided with an opening corresponding to said at-least-one opening of said projected surface, and wherein said projected surface comprises the top surface of a wall portion formed to surround said opening of the flat surface.

15. The structure according to claim 13, wherein said projected surface comprises the top surface of a portion protruded from said flat surface of the metal plate, and said opening of the circuit board is set to be larger than that of said protruded portion of the metal plate but smaller than that of said imaging device.

16. The structure according to claim 15, wherein said protruded portion comprises a quadrilateral wall portion, and said opening of the circuit board is of a square shape.

17. A method for mounting a solid-state imaging device on an optical unit, which comprises:

providing a metal plate having a flat surface, a backside surface opposite to said flat surface, a projected surface projected by a predetermined height from the flat surface, said projected surface being parallel to said flat surface, and at least one opening formed on said projected surface and accessible through said backside surface;

contacting the back surface of said solid-state imaging device to said projected surface of the metal plate so as to close said at-least-one opening;

anchoring said back surface to said projected surface by applying adhesive at least to a corner edge portion formed by the inner circumferential surface of said at-least-one opening of the metal plate and said back surface of the imaging device; and fixing said metal plate carrying said imaging device thereon onto said optical unit.

18. The method according to claim 17, which further comprises:

providing a circuit board having an opening through which said projected surface of the metal plate passes;

disposing said circuit board on said metal plate with allowing said projected surface to pass through said opening of the circuit board before contacting said imaging device to said metal plate so that the circuit board is held between said metal plate and said imaging device when said imaging device is secured to said metal plate; and electrically connecting said imaging device with said circuit board.

* * * * *